(12) United States Patent
Mishra et al.

(10) Patent No.: US 11,481,993 B2
(45) Date of Patent: Oct. 25, 2022

(54) TRAINED MACHINE LEARNING MODEL FOR ESTIMATING STRUCTURE FEATURE MEASUREMENTS

(71) Applicant: Hover Inc., San Francisco, CA (US)

(72) Inventors: Ajay Mishra, Palo Alto, CA (US); William Castillo, San Carlos, CA (US); A. J. Altman, San Francisco, CA (US); Manish Upendran, San Francisco, CA (US)

(73) Assignee: HOVER INC., San Francisco, CA (US)

( * ) Notice: Subject to any disclaimer, the term of this patent is extended or adjusted under 35 U.S.C. 154(b) by 966 days.

(21) Appl. No.: 15/701,321

(22) Filed: Sep. 11, 2017

(65) Prior Publication Data

US 2019/0080200 A1 Mar. 14, 2019

(51) Int. Cl.
*G06V 10/42* (2022.01)
*G06N 3/08* (2006.01)
*G06K 9/62* (2022.01)
*G06T 7/60* (2017.01)
*G06T 17/00* (2006.01)
*G06N 20/00* (2019.01)

(52) U.S. Cl.
CPC .......... *G06V 10/42* (2022.01); *G06K 9/6256* (2013.01); *G06N 3/08* (2013.01); *G06N 20/00* (2019.01); *G06T 7/60* (2013.01); *G06T 17/00* (2013.01); *G06T 2207/20081* (2013.01); *G06T 2207/20084* (2013.01); *G06T 2207/30132* (2013.01); *G06T 2210/04* (2013.01)

(58) Field of Classification Search
CPC .......... G06K 9/52; G06K 9/6256; G06N 3/08; G06N 20/00; G06N 3/0454; G06T 7/60; G06T 17/00; G06T 2207/20081; G06T 2207/20084; G06T 2207/30132; G06T 2210/04; G06V 10/42

See application file for complete search history.

(56) References Cited

U.S. PATENT DOCUMENTS

| 9,070,018 B1* | 6/2015 | Ciarcia | G06V 10/44 |
| 2007/0269102 A1* | 11/2007 | Wang | G01S 17/86 |
| | | | 382/154 |
| 2015/0347872 A1* | 12/2015 | Taylor | G06K 9/3233 |
| | | | 382/224 |
| 2015/0371112 A1* | 12/2015 | Sun | G06V 20/10 |
| | | | 382/160 |

(Continued)

OTHER PUBLICATIONS

Siddula et al., "Learning in Unordered and Static Daily Construction Site Photos for Roof Detection: A Step toward Automated Safety Performance Monitoring for Work on Rooftops", 2016, icccbe2016, pp. 1661-1668. (Year: 2016).*

*Primary Examiner* — Brent Johnston Hoover
(74) *Attorney, Agent, or Firm* — Knobbe, Martens, Olson & Bear, LLP

(57) ABSTRACT

A computer system trains a machine learning model to estimate a real-world measurement of a feature of a structure. The machine learning model is trained using a plurality of digital image sets, wherein each image set depicts a particular structure, and a plurality of measurements, wherein each measurement is a measurement of a feature of a particular structure. After the machine learning model is trained, it is used to estimate a measurement of a feature of a particular structure depicted in a particular image set.

32 Claims, 4 Drawing Sheets

(56) References Cited

U.S. PATENT DOCUMENTS

| | | | |
|---|---|---|---|
| 2016/0342862 A1* | 11/2016 | Liu | G06T 15/10 |
| 2017/0024642 A1* | 1/2017 | Xiong | G06N 3/0454 |
| 2017/0076438 A1* | 3/2017 | Kottenstette | G06K 9/627 |
| 2018/0150713 A1* | 5/2018 | Farooqi | G06K 9/6268 |
| 2018/0314253 A1* | 11/2018 | Mercep | B60R 16/0231 |
| 2018/0365496 A1* | 12/2018 | Hovden | G06T 19/003 |

* cited by examiner

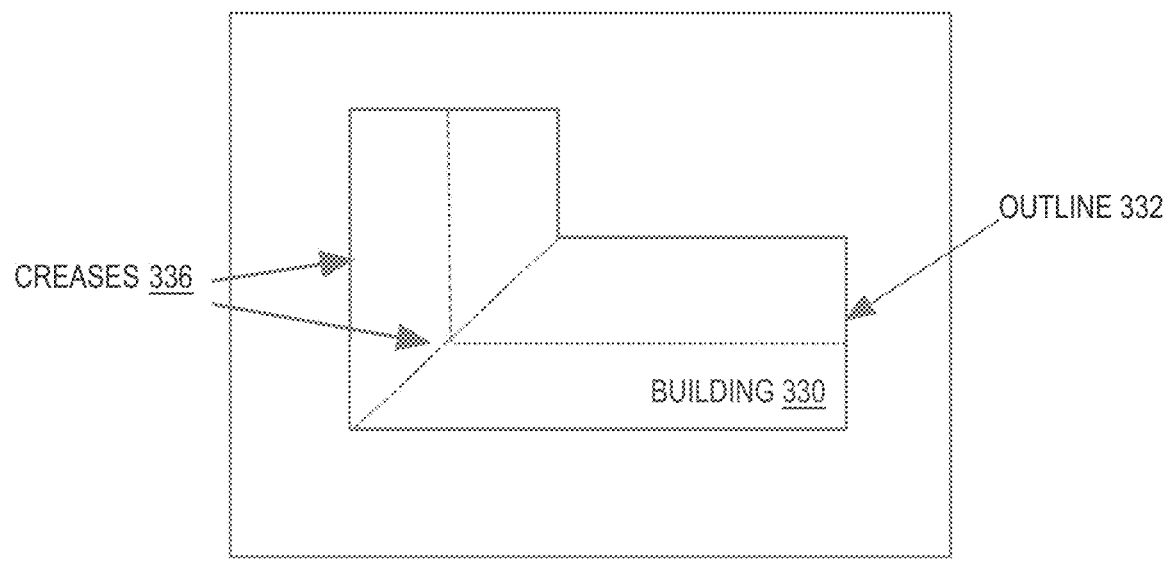
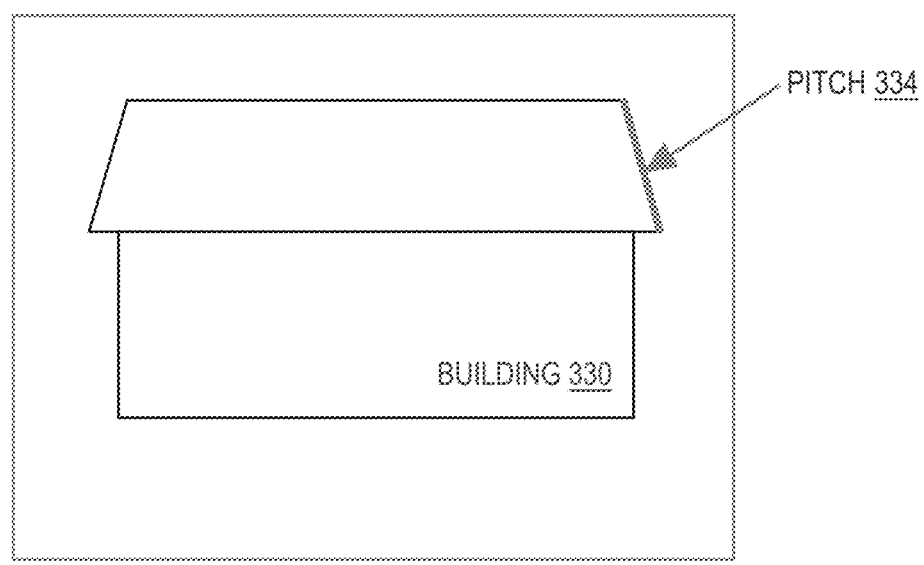
FIG. 3

TRAINED MACHINE LEARNING MODEL FOR ESTIMATING STRUCTURE FEATURE MEASUREMENTS

FIELD OF THE INVENTION

The present invention relates to machine learning models, and more specifically, to training a machine learning model to estimate a measurement of a structure feature depicted in a set of digital images.

BACKGROUND

Three-dimensional (3D) models of a building may be generated based on two-dimensional (2D) digital images taken of the building. The digital images may be taken via aerial imagery, specialized-camera equipped vehicles, or by a user with a camera. The 3D building model is a digital representation of the physical, real-world building. An accurate 3D model may be used to derive various building measurements or to estimate design and renovation costs.

However, generating a 3D model of a building requires significant time and resources. If only a particular measurement, or set of measurements, is needed, it would be inefficient to generate a 3D model of the whole building in order to derive the particular measurement or measurements. Thus, an efficient method for estimating building feature measurements from digital images, without generating a full 3D model of the building, is desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 3 illustrates an example image set;

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for training a machine learning model to estimate a measurement for a feature of a real-world structure. As used herein, the term "structure" refers to anything with a feature whose measurements may be estimated based on images depicting the structure. A structure may be a man-made structure, such as buildings, walls, fences, swimming pools, and etc. A measurement is the actual real-world distance associated with a real-world feature (e.g. length of a roof) or any value that is based on such a distance (e.g. the area of a roof). A feature is any element, portion, or attribute of a real-world structure. Measurements of a feature include, for example, the square footage of a roof, the perimeter length of a pool, the area of a wall, etc.

For the purpose of explanation, examples shall be given herein where the features whose measurements are being estimated are features of buildings. However, the techniques described herein are not limited to any particular type of structure or feature.

In an embodiment, to train the machine learning model, the machine learning model is provided a plurality of digital image sets and a plurality of real-world measurements. Each digital image set depicts a particular structure or one or more portions of a particular structure. Each real-world measurement corresponds to a particular image set and is an actual measurement of a feature of the depicted structure or a feature derived from a structure. For example, each image set may depict a particular building or a part of the particular building, and the corresponding measurement is the roof area of the particular building.

In an embodiment, using the plurality of image sets and the plurality of real-world measurements, the machine learning model is trained to estimate a particular measurement for a particular type of structure. In some embodiments, the machine learning model is trained to determine a particular type of structure and estimate a measurement based on the type of structure. In other embodiments, the machine learning model is trained to estimate one or more variables that are used to calculate the particular measurement.

After the machine learning model is trained, the machine learning model may be used to estimate a measurement of the real-world feature of a structure depicted in a particular image set.

Machine Learning Model

Figure 1:
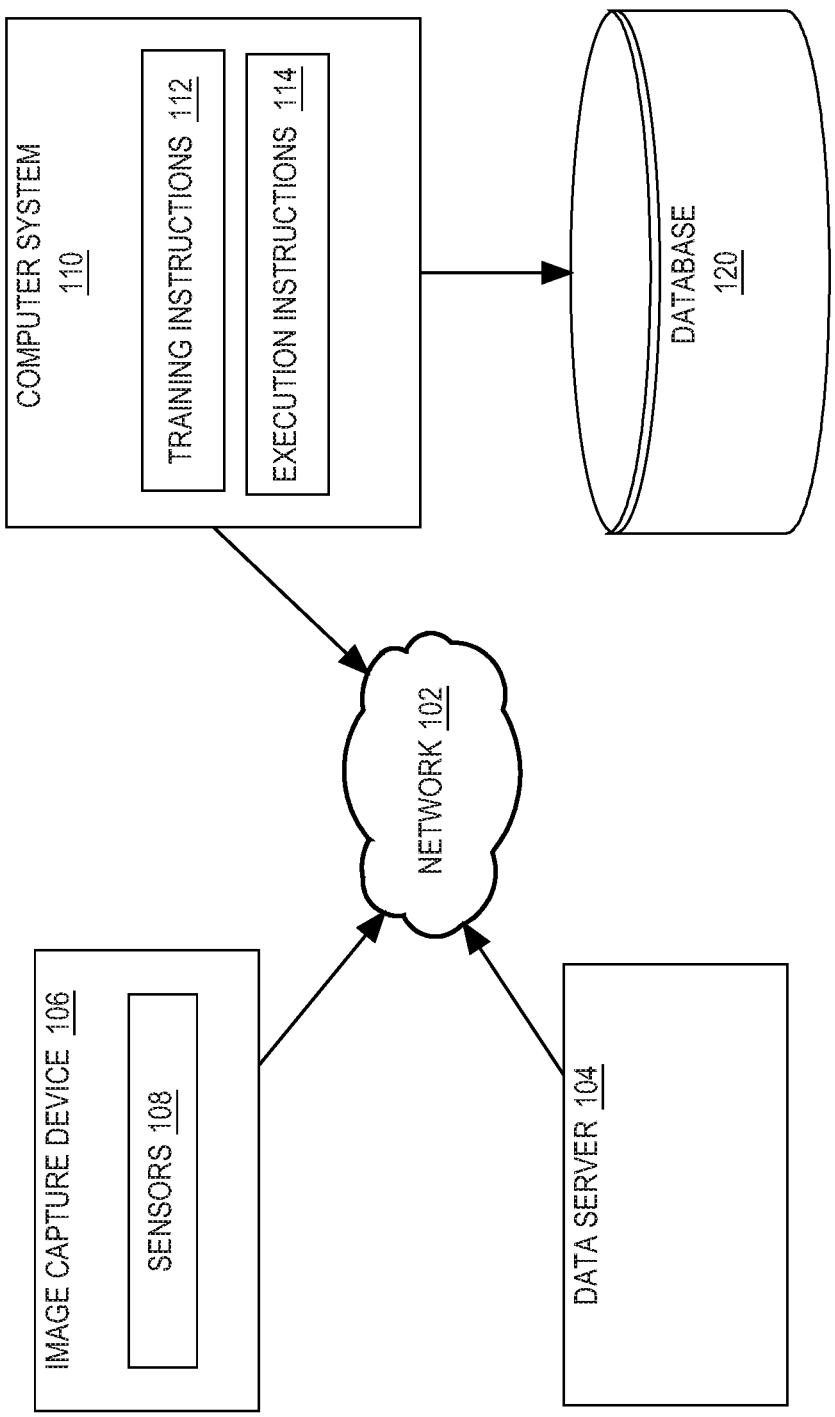
FIG. 1 illustrates an example computer system configured to perform the functions described herein.

FIG. 1 illustrates an example computer system 110 that is configured to perform the techniques described herein. In the illustrated embodiment, computer system 110 is communicatively coupled via a network 102 to a data server 104 and an image capture device 106. Example computer system 110 may include, or communicate with, other devices including computing devices, image capture devices, databases and other data storage devices, and display devices, according to embodiments. For example, a plurality of image capture devices and data servers may be communicatively coupled to computer system 110. As another example, one or more of the services attributed to computer system 110 herein may be run on other computer systems that are communicatively coupled to network 102 or run internally on different parts of a single computer system.

Computer system 110 may be implemented by any type of computing device that is communicatively coupled to network 102. Example implementations of computer system 110 include, but are not limited to, workstations, personal computers, laptops, connected devise such as a mobile phone or tablet, multi-processor systems, and the like. Although FIG. 1 shows a single element, computer system 110 may comprise one or more computers, such as a server cluster, and the computer system 110 may be located in one or more physical locations.

In the illustrated embodiment, computer system 110 is communicatively coupled to a database 120, which stores images received at computer system 110. Database 120 may also store metadata associated with each image. In one embodiment, database 120 is a data storage subsystem consisting of programs and data that is stored on any suitable storage device such as one or more hard disk drives, memories, or any other electronic digital data recording device configured to store data. Although database 120 is depicted as a single device in FIG. 1, database 120 may span multiple devices located in one or more physical locations. Database 120 may be internal or external to computer system 110.

In some embodiments, computer system 110 may download, obtain, or receive digital images from various sources, such as data server 104 or image capture device 106. Example sources include image capture devices, remote computing devices, such as mobile phones or server computers, and satellite image providers, such as National Aeronautics and Space Administration (NASA), United States Geological Survey (USGS), and Google Earth.

Data server 104 may be any computing device, including but not limited to: servers, racks, work stations, personal computers, laptops, Internet appliances, wireless devices, wired devices, multi-processor systems, and the like. Although FIG. 1 shows a single element, the data server 104 broadly represents one or more multiple server computers, such as a server cluster, and data server 104 may be located in one or more physical locations. Data server 104 may also represent one or more virtual computing instances that execute using one or more computers in a datacenter such as a virtual server farm. Data server 104 may receive or obtain digital images from an image capture device 106, users, other data servers, or other sources. Data server 104 may also transmit digital images to computer system 110.

Image capture device 106 may be any device that can capture or record images and videos. For example, image capture device 106 may be any computing device with a built-in camera or a communicatively coupled digital camera. Example image capture devices include mobile phones, tablets, a computer with a webcam, a drone, or a specialized camera-equipped vehicle. In the illustrated embodiment, image capture device 106 includes one or more sensors 108. Sensor data from sensors 108 may be stored in association with digital images captured by image capture device 106. Additionally or alternatively, sensor data from sensors 108 may be transmitted independently of digital images captured by image capture device 106. Example sensors include, but are not limited to, global positioning system (GPS), accelerometers, altimeters, gyroscopes, magnetometers, temperature sensors, light sensors, and proximity sensors. The number and types of sensor data associated with a digital image may vary depending on the image capture device and the particular implementation.

In the illustrated embodiment, image capture device 106 is connected to data server 104 and computer system 110 via network 102. Image capture device 106 may be configured to transmit images directly to a data server 104 or to computer system 110.

Computer system 110 further comprises training instructions 112 and execution instructions 114. Training instructions 112 comprise one or more instructions which, when executed by computer system 110, cause computer system 110 to train a machine learning model using a plurality of image sets, each of which comprise one or more digital images, and a plurality of measurements. Execution instructions 114 comprise one or more instructions which, when executed by computer system 110, cause computer system 110 to use the trained machine learning model to compute one or more measurements from a particular image set.

Machine Learning Model

Training instructions 112 and execution instruction 114, when executed, train and use a machine learning model. Various machine learning algorithms and structures are available to implement the machine learning model. Example machine learning algorithms include artificial neural networks, deep neural networks, convolution neural networks, recursive neural networks, classifiers, and other supervised or unsupervised machine learning algorithms. The proposed method and system may be implemented using any suitable machine learning algorithm or architectures.

In an embodiment, the machine learning model is a convolutional neural network (CNN). An example CNN architecture includes Microsoft's ResNET, described by Kaiming He, Xiangyu Zhang, Shaoqing Ren, and Jian Sun. "Deep Residual Learning for Image Recognition." arXiv: 1512.00385. https://arxiv.org/pdf/1512.03385.pdf.

A neural network is a machine learning technique that utilizes a network of learning units, also referred to as neural nodes. The neural nodes are trained to convert an input, such as an image, into corresponding output signals, such as a feature measurement. In a convolutional neural network, the plurality of neural nodes are arranged in a plurality of layers. Each node receives input from one or more nodes in layers below it, and passes data to one or more nodes in layers above it.

Each neural node may be associated with a weight that is applied to the data it receives to generate output to pass to a subsequent neural node. Each neural node may also be associated with a threshold value, wherein output is passed to one or more subsequent nodes if the threshold value is met.

Digital Image Sets

In an embodiment, the input provided to a machine learning model includes an image set comprising one or more digital images. The image set may depict a particular structure, and each digital image of the image set may depict a different view of the particular structure. For example, a first digital image may depict a front view of a structure and a second digital image may depict a top-down view of the same structure.

A digital image may be an orthographic image, an oblique image, or a lateral image. An orthographic image is an image taken from overhead, such as a satellite image. An orthographic image depicts a top-down view of a structure.

An oblique image is an aerial image taken at an angle, typically about forty-five degrees. An oblique image depicts a portion of the top of a structure and a portion of the side(s) of the structure.

A lateral image is an image that substantially depicts one or more sides of a single building, such as a front or back view, side view, or a corner view. In an embodiment, a lateral image may be a ground level image. A ground level image is an image taken at or near ground level facing a structure. Additionally, a lateral photo may be captured at higher levels using, for example an image capture device mounted on a stick or on a drone.

In an embodiment, an image set comprises one or more images of the same image type. For example, an image set may comprise a single orthographic image. As another example, an image set may comprise a plurality of lateral images.

In other embodiments, an image set comprises a combination of image types. For example, an image set may comprise an orthographic image and one or more lateral images.

Each digital image may also include metadata associated with the digital image. The metadata may be stored with the digital image, provided to the machine learning model in association with the digital image, or provided separately but in association with the digital image. The metadata indicates information related to the digital image or to objects depicted in the image. For example, metadata may indicate the location where the digital image was captured or a sequence number indicating an image capture sequence. As another example, a user or other data source may provide information related to a structure depicted in the digital image, such as whether particular elements are present in the digital image, dimensions of particular elements of the structure, the structure type, and etc. The information may be stored as metadata associated with the image. In an embodiment, metadata associated with a digital image includes sensor data from the image capture device that captured the digital image.

Training the Machine Learning Model

In an embodiment, training a machine learning model comprises providing the machine learning model with a set of training data. The training data comprises a plurality of input data and a plurality of corresponding output data. The machine learning model uses the training inputs and the training outputs to infer a method for correlating the input to the output. Additionally, output generated by training the machine learning model may be provided as training inputs for a different machine learning model or for iteratively training the same machine learning model.

In an embodiment, the machine learning model is a neural network wherein each neural node is associated with a weight and a threshold value. Training the machine learning model comprises determining a weight and a threshold value for each neural node such that the training input generates output similar to the provided training output. Additionally, the output generated by training the machine learning model may be stored in association with the training input. The stored output may be used to generate a confidence level for future outputs generated by the machine learning model.

In an embodiment, the training input comprises a plurality of digital image sets and the training output comprises a plurality of corresponding measurements. The measurements provided as training data are the type(s) of measurements that the machine learning model is being trained to estimate. Based on the training data, the machine learning model is trained to estimate a particular measurement when provided an input image set.

Each image set depicts a particular structure. In an embodiment, each image set of the plurality of image sets depicts the same type of structure. The plurality of measurements correspond to measurements of a feature shared by the type of structure. Additionally or alternatively, the plurality of measurements may correspond to measurements of a feature related to the type of structure or related to a feature shared by the type of structure.

For example, each image set in the training data may depict a window, and each measurement may be the height of the window depicted in the corresponding image set. As another example, each image set may depict walls, and the measurement may be the volume of the wall.

In some embodiments, the plurality of image sets depict different types of structures. The machine learning model may be trained to determine the type of structure and the measurement associated with the type of structure. For example, assume the plurality of image sets include both image sets that depict windows and image sets that depict walls. The machine learning model may determine if an image set depicts a window or a wall. If the machine learning model determines the image set depicts a window, then the machine learning model estimates the height of the window. If the machine learning model determines the image set depicts a wall, then the machine learning model estimates the volume of the wall.

In an embodiment, the machine learning model is trained to estimate one or more component variables that are used to calculate a measurement. For example, the volume of a wall is calculated by multiplying the area of the base of the wall with the height of the wall. The machine learning model may be trained to estimate either the area or the height. Alternately, the machine learning model may be trained to output both values, the area and the height.

Additionally, the outputs of a machine learning model may be used to calculate additional feature measurements. For example, a machine learning output that includes the measurement of a roofline for a side of a building may be used as an input to calculate the length of a gutter for the same side of the building. Similarly, a gutter measurement for the side of the building may be provided as an input to a machine learning model, in addition to other associated metadata, to calculate the roofline for the side of the building.

In other embodiments, the machine learning model is trained to estimate the measurement directly. The machine learning model may be provided a formula used to calculate the measurement. The machine learning model is trained to estimate the measurement based on the formula. In the above example, rather than estimating the area and/or the height of the wall, the machine learning model is trained to estimate the volume of the wall directly.

The techniques are described using a single machine learning model, but in other embodiments may be used with any number of machine learning models. For example, in the example above, a first machine learning model may be trained to estimate the area of a wall, and a second machine learning model may be trained to estimate the length of the wall. As another example, a first machine learning model may be trained to identify the type of structure, and one or more machine learning model may be trained to estimate a measurement of a feature of one or more corresponding types of structures.

As described above, each image set may comprise one or more digital images of one or more image types. The number and types of images in an image set may depend on the type of measurement being estimated. For example, if the machine learning model is trained to estimate the length of a wall, each image set may comprise one or more ground-level images of a wall. If the machine learning model is trained to estimate the area of the base of the wall, each image set may comprise one or more orthographic images of a wall. If the machine learning model is trained to estimate the volume of the wall, each image set may comprise one or more orthographic images and one or more ground-level images.

In an embodiment, rather than providing the entire digital image, each image of an image set comprises only metadata describing the image. For example, the metadata may include sensor data from when the image was captured and information describing the structure depicted in the image.

Normalizing Digital Images

In an embodiment, one or more digital images in an image set are normalized before being provided to the machine learning model as training input. Normalization reduces the number of independent variables or features in the images, which increases the accuracy of the trained machine learning model.

In an embodiment, normalizing an image comprises normalizing the scale. Normalizing the scale of the image scales the image such that pixels correspond to the same real-world metric distance. Scaling the image may comprise one or more of cropping, stretching, or re-sizing the image.

As an example, an orthographic image may be captured at a particular geographic coordinate and at a particular height range. For example, an orthographic image at height level 24 may correspond to a height of 100 to 150 feet from the ground. Thus, even though each orthographic image at level 24 was taken from the same height level, the actual height, and thus the image scale, varies between images. The orthographic images may be scale normalized such that each scaled image depicts the same number of metric feet per pixel.

For example, starting from the center of an image, the image may be cropped to 50 feet out, resulting in a digital image that depicts a 100 feet by 100 feet real-world area. The cropped image may be scaled to 200 by 200 pixels, so that pixels in each scaled image represent the same metric distance, 0.5 feet by 0.5 feet.

In an embodiment, normalizing the image comprises rotating the image. Images of the same type may be rotated such that particular features face a particular direction, align with a particular edge of the image, or are otherwise consistent across the images.

As an example, a plurality of orthogonal images may each depict a top-down view of a structure. The structure may be at a different angle in each picture. The images may be rotated so that the front of the structure, or the side designated as the front of the structure, faces the same direction.

As another example, a plurality of ground-level images may each depict the front of a structure. Each ground-level image may be rotated so that the base of the structure is parallel to the bottom of the image.

In some embodiments, a machine learning model is trained to normalize images or to perform calculations related to normalizing images. For example, a machine learning model may be trained to calculate the current scale of an image in order to determine how the image needs to be scaled.

In some embodiments, normalizing an image is based, in part, on metadata associated with the image or with other images in the image set. For example, orthographic images may be rotated so that the front of the structure depicted in each orthographic image is facing north. Determining the direction the front of the structure is facing in the original image may be based on a ground level image from the same image set. The ground level image may include metadata indicating azimuth information. Azimuth indicates which direction the image capture device was facing, relative to north, when the digital image was captured. By correlating the azimuth information with the structure depicted in the ground level image and the orthographic image, the degree of rotation needed in order for the front of the structure in the orthographic image to face north can be calculated.

In an embodiment, the steps for normalizing any particular image is based on the type of image. For example, assume an image set comprises an orthographic image and a ground-level image. The orthographic image may be scaled and the ground-level image may be rotated.

In an embodiment, one or more images in an image set may be normalized and one or more images in an image set are not normalized. Referring to the above example, orthographic images may be scaled while ground-level images may not be normalized.

In an embodiment, the steps for normalizing an image is based on the type of structure. For example, an orthographic image of a building may be rotated so that the front of the building faces north, while an orthographic image of a pool is not rotated.

Removing Low-Quality Digital Images

In an embodiment, low quality images are removed from the plurality of image sets provided to the machine learning model as training data. In some embodiments, if an image set includes a low quality image, the image set is removed from the plurality of image sets provided to the machine learning model as training data. Removing low quality digital images, or image sets with low quality images, increases the overall quality of the training data, which increases the accuracy of the trained machine learning model.

An image may be considered a low quality image, for example, if the image has too much noise, if the image is too dark, if the structure depicted in the image is too occluded, if a structure is not depicted in the image, if the structure depicted in the image is not an expected structure type, if a particular feature is too occluded, or if a particular feature is not depicted in the image. As referred to herein, "occluded" refers to an object, or at least a portion of the object, in an image being obscured, covered, hidden, cut off, or otherwise not fully visible within the image. Additionally, an image may be considered low quality if certain features cannot be detected in the image. For example, a machine learning model may be trained to detect corners and the image includes a corner of a building, but the image does not depict the portion of the corner in contact with the ground or the supporting wall.

In an embodiment, a classifier is trained to determine one or more features of a low quality image. A classifier is a type of machine learning model that receives an input and outputs a classification. A classification may indicate, for example, the type of structure or feature depicted in an image, whether an image is too dark or too noisy, whether a feature or structure is visible. The output generated by the classifier is used to determine whether to keep or discard an image. In other embodiments, a user may review the digital images to determine whether the image is usable. Additionally or alternatively, the output of the classifier may be used as feedback to determine if the image should be retaken. The feedback may be provided to any user or device that is reviewing the digital images. For example, the classifier may receive images as they are captured, and the user or device may be notified that a recently captured image should be re-taken.

In an embodiment, if an image set includes a low-quality image, then the image set is removed from the plurality of image sets that are provided as training data. Alternately, if the image set is usable as training data without the low quality image(s), then image set is provided as training data without the low quality image(s).

For example, assume an image set includes a plurality of lateral images and a particular lateral image is a low quality image because the structure depicted in the image is too obscured. If one or more remaining lateral images depict a similar view of the structure, then the remaining lateral images can still be used as training data.

Using The Trained Machine Learning Model

After the machine learning model is trained, the trained machine learning model may be used to estimate a measurement of a feature of a structure. The machine learning model receives a particular image set as input and generates output for the particular image set. The particular image set may be an image set that was not in the plurality of image sets used to train the machine learning model. In an embodiment, the particular image set includes images of the same image type(s) as the image sets used to train the machine learning model. In an embodiment, the particular image set includes at least the same number of images as the image sets used to train the machine learning model.

In an embodiment, the machine learning model is trained to estimate a measurement for a particular type of structure. For example, the machine learning model may be trained to estimate the perimeter length of a water feature, such as a pool or fountain. The machine learning model receives an image set depicting a structure of the particular structure type and outputs the measurement.

In other embodiments, the machine learning model is trained to determine the type of structure and estimate a particular type of measurement based on the type of structure. The machine learning model determines the type of structure and outputs the measurement associated with the particular structure type. In other embodiments, a first machine learning model is trained to determine the type of structure and a second machine learning model is trained to estimate a measurement of a feature for the particular type of structure. Additionally or alternatively, a plurality of machine learning models may each be trained to determine a particular type of structure. The plurality of machine learning models may be used to determine the type of structure, or to eliminate possible types of structures until a potential type of structure is identified.

In an embodiment, the machine learning model is trained to estimate one or more component variables that are used to calculate the measurement. The machine learning model outputs the one or more component variables. The measurement is calculated based on the one or more component variables. In other embodiments, a plurality of machine learning models are each trained to output a respective component variable.

Example Process

Figure 2:
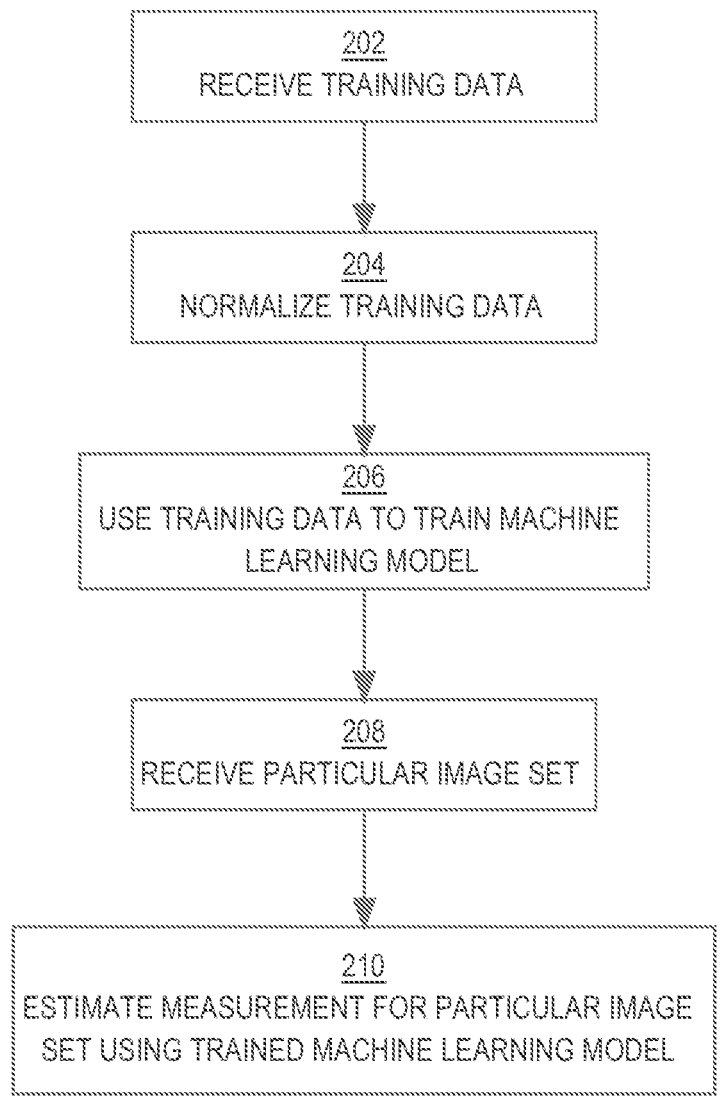
FIG. 2 illustrates an example process for training and using a machine learning model to estimate a measurement of a feature.

FIG. 2 illustrates an example process for training a machine learning model to estimate a measurement of a feature of a structure. For the purpose of illustrating a clear example, assume the structure is a building and the measurement is the area of the roof.

At step 202, training data is received at a computer system, wherein the training data comprises a plurality of image sets and a plurality of measurements. The training data may be received or retrieved from a single source or from a plurality of sources. For example, the computer system 110 may receive or retrieve image sets from one or more of data server 104, image capture device 106, or database 120.

Each image set of the plurality of image sets comprises one or more digital images depicting a building. In an embodiment, an image set comprises an orthographic image and one or more ground level images. In other embodiments, an image set comprises a single orthographic image. In another embodiment, an image set comprises one or more ground level images and no orthographic images. In other embodiments, an image set may comprise only metadata describing one or more images and no photos or digital image files.

FIG. 3 illustrates an image set, according to an embodiment. Image set 300 comprises an orthographic image 310 and a ground-level image 320. Orthographic image 310 depicts a top-down view of building 330, including roof outline 332. Roof outline 332 is an outline of the roof of building 330. Ground-level image 320 depicts the front of the building, including roof pitch 334. Roof pitch 334 is a slope of the roof of building 330.

In the illustrated embodiment, the roof area is calculated or estimated using the estimated roof outline and the estimated roof pitch, based on a linear regression. As an example, $a_k$ may be one or more coefficients that are determined by training a machine learning model, x may be the area of the estimated roof outline, and y may be the estimated pitch of the roof. An example linear regression $f(x,y)$ for calculating roof square footage may be:

$$f(x,y)=a_0+a_1x+a_2y+a_3xy+a_4x^2+a_5y^2$$

In an embodiment, an image set comprises only an orthographic image 310. The roof area may be calculated by dividing the roof outline 332 into one or more portions and estimating the area of each portion. For example, referring to FIG. 3, the top-down view of building 330 depicts a plurality of roof creases 336. The roof creases 336 indicate where portions of the roof of the building intersect. Roof outline 332 may be divided into one or more portions based on the roof creases 336. Alternately, a roof pitch may be provided from another source, such as a user, metadata associated with the image, a database or server, or an application or computing device that calculates the roof pitch separately. The roof area may be calculated by using the estimated roof outline from image 310 and the provided roof pitch.

In an embodiment, an image set comprises a plurality of lateral images and no orthographic image. The roof outline may be estimated using the plurality of lateral images. Alternately, the roof outline may be provided from another source, such as a user, metadata associated with one or more of the lateral images, a database or server, or an application or computing device that calculates the roof outline separately. The roof pitch is estimated based on one or more of the lateral images. The roof area is calculated using the estimated roof pitch and the roof outline.

At step 204, one or more images in each image set are normalized. For example, orthographic image 310 may be scale normalized so that each image is the same size and each image corresponds to the same metric area size At step 206, a machine learning model is trained using the training data. For example, computer system 110 executes training instructions 112 to train a machine learning model using the plurality of image sets and the plurality of measurements.

In an embodiment, the machine learning model is trained to estimate the roof area directly. The plurality of measurements includes a pre-calculated roof area for each image set.

In an embodiment, the machine learning model is trained to estimate a roof outline and a roof pitch. The plurality of measurements include a pre-calculated roof outline and a pre-calculated roof pitch for each corresponding image set. Alternately, a first machine learning model is trained to estimate the roof outline and a second machine learning model is trained to estimate the slope of the roof. The first machine learning model is trained using at least a portion of each image set in the plurality of image sets and a corresponding roof outline for each image set. The second machine learning model is trained using at least a portion of each image set in the plurality of image sets and a corresponding roof pitch for each corresponding image set.

At step 208, a particular image set is received. The particular image set comprises the same number of images of the same image types as the image sets used to train the machine learning model. The images in the particular image set depict a particular real-world building.

At step 210, the trained machine learning model is used to generate output for particular image set. If the machine learning model was trained to estimate the roof area directly, then the trained machine learning model outputs an estimated roof area for the particular real-world building. If the machine learning model was trained to estimate the roof outline and/or the roof pitch, then the machine learning model outputs an estimate roof outline and/or estimated roof pitch for the particular real-world building.

In an embodiment, the steps of FIG. 2 may be repeated, such that outputs from a first machine learning model at step 210 are used as training inputs at step 202 or a particular input at step 208 for a second machine learning model.

Estimated Measurement Confidence Level

In an embodiment, computer system 110 is further configured to provide a confidence level associated with the estimated measurement. The confidence level estimates how accurate the estimated measurement is expected to be.

In an embodiment, the confidence level indicates whether the estimated measurement is expected to be within a particular accuracy range. For example, computer system 110 may indicate whether the expected error will be less than 15%. Additionally, if the estimated measurement is not expected to be within the particular accuracy range, the user may be notified that the measurement may be inaccurate. Alternately, the estimated measurement may not be provided to the user if it is not within the particular accuracy range.

In an embodiment, determining a confidence level comprises comparing the particular structure depicted in the particular image set with the structures depicted in the training data. The confidence level may be based on how different the particular structure is from the training structures. Factors for determining differences include, but are not limited to, structure size, structure shape, expected features of the structure type.

In the above example, the machine learning model was trained to estimate the roof area of buildings. For the purpose of illustrating a clear example, assume the buildings depicted in the training data are primarily houses of an average size and shape. The confidence level may be high if the particular image set depicts a traditional house. The confidence level may be low if the particular image set depicts an unusually large house and/or an oddly-shaped house.

In an embodiment, determining a confidence level comprises comparing the measurement estimated by the machine learning model with an expected measurement or an expected range of measurements. In an embodiment, an expected range of measurement is determined by determining a number of pixels in an image corresponding to the feature being measured. The number of pixels are used to generate a rough measurement. If the estimated measurement differs from the rough measurement by more than a threshold amount, then the confidence level is low.

In the above example, assume an image set includes an orthographic image depicting the roof of a building. The number of pixels comprising the depicted roof may be counted and used to estimate a rough square footage of the roof. If the roof is obscured or if the image is otherwise low-quality, then the rough measurement would differ significantly from the estimated square footage.

In other embodiments, determining a confidence level comprises determining if the particular image set includes a low-quality image as described above for the training data. If the particular image set includes a low-quality image, then the confidence level is low.

In an embodiment, the confidence level is calculated before using the machine learning model to estimate a measurement. In other embodiments, the confidence level is calculated after the measurement is estimated using the machine learning model.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
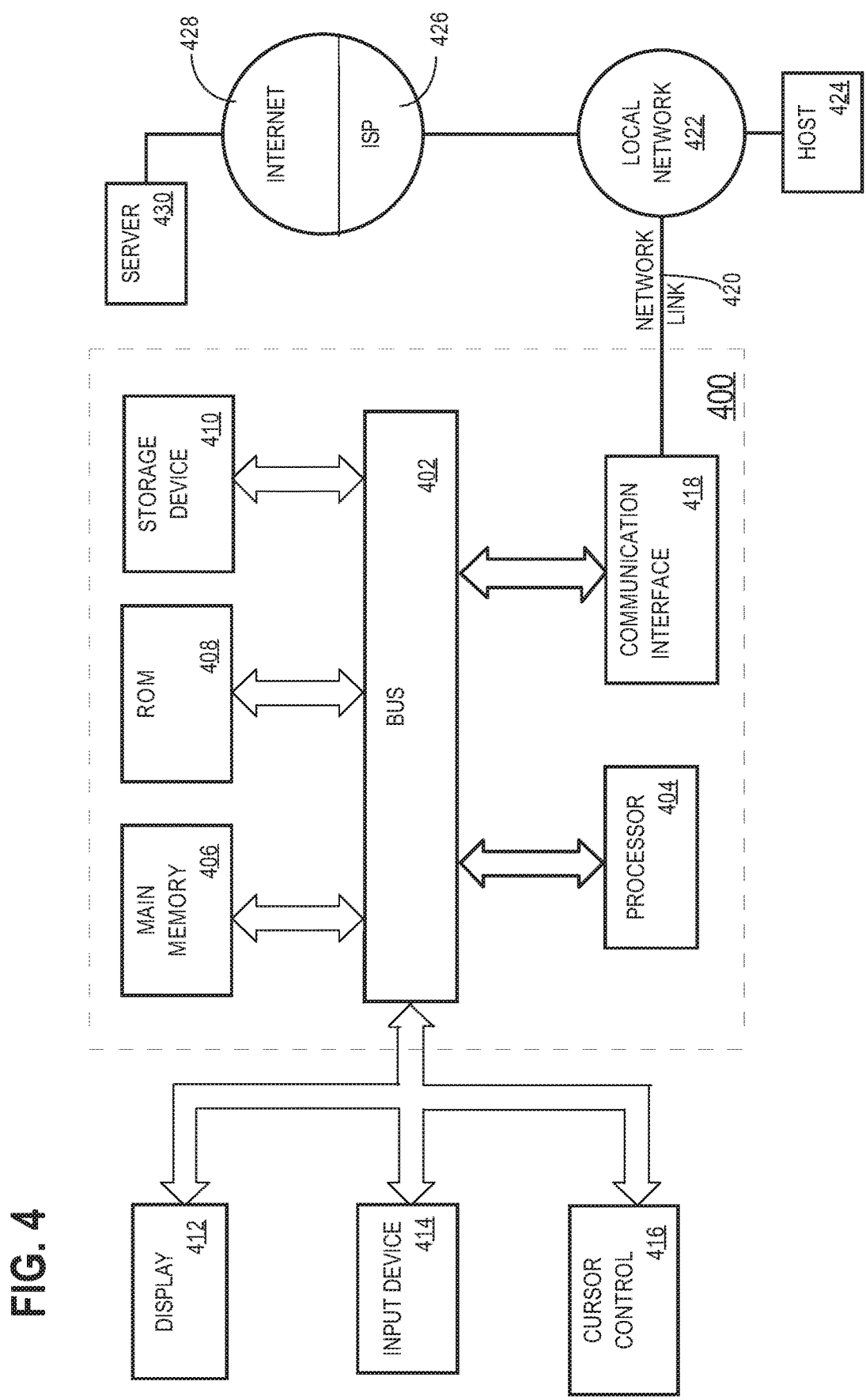
FIG. 4 is a block diagram illustrating a computer system that may be used to implement the techniques described herein.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
 training a machine learning model to estimate real-world measurements of features of real-world structures, wherein training the machine learning model includes providing to the machine learning model:
 a plurality of image sets, wherein each image set of the plurality of image sets includes one or more 2-dimensional images of an exterior of a corresponding real-world structure, and
 a plurality of real-world measurements, wherein the plurality of real-world measurements includes, for each image set of the plurality of image sets, a real-world measurement of a feature of the exterior of the corresponding real-world structure; and after training the machine learning model using the machine learning model to estimate a particular real-world measurement of a particular feature of a particular real-world structure based on a particular digital image set containing one or more 2-dimensional images of an exterior of the particular real-world structure;

wherein the particular digital image set comprises metadata indicating a measurement of a second feature depicted in the one or more 2-dimensional images other than the particular feature, wherein the measurement of the second feature is a value based on an actual real-world distance of a dimension of the second feature;

wherein said using the machine learning model to estimate the particular real-world measurement of the particular feature comprises:
using the machine learning model to estimate the particular real-world measurement of the particular feature based, at least in part, on the measurement of the second feature, wherein the particular real-world measurement of the particular feature is a value based on an actual real-world distance of a dimension of the particular feature; and
estimating a roof pitch, wherein the particular digital image set for estimating the roof pitch includes one or more lateral photos of the exterior of the particular real-world structure and no orthographic photos of the exterior of the particular real-world structure.

2. The method of claim 1 wherein estimating the particular real-world measurement is based on a polynomial regression.

3. The method of claim 1 further comprising:
comparing the particular real-world structure with the plurality of real-world structures to identify how different the particular real-world structure is from the plurality of real-world structures;
based on how different the particular real-world structure is from the plurality of real-world structures, determining a confidence level associated with the particular real-world measurement.

4. The method of claim 1 wherein the particular digital image set includes an orthographic photo and one or more lateral photos.

5. The method of claim 1 wherein training the machine learning model is based on one or more metadata associated with at least one image in each image set of the plurality of image sets.

6. The method of claim 1 further comprising:
after training the machine learning model, using the machine learning model to estimate a second real-world measurement of a second feature of a second real-world structure based on a dataset comprising metadata describing second one or more images of the second real-world structure;
wherein using the machine learning model to estimate the second real-world measurement involves generating an estimate of the second real-world measurement without providing the machine learning model the second one or more images themselves.

7. The method of claim 1 wherein training the machine learning model is based on output from a second machine learning model.

8. The method of claim 1 wherein the particular real-world structure is a particular building and the plurality of image sets correspond to a plurality of buildings.

9. The method of claim 8 wherein the particular feature of the particular building is a roof of the particular building, and the particular real-world measurement is an area of the roof.

10. The method of claim 9 wherein:
the machine learning model is a first machine learning model; and
using the first machine learning model to estimate the particular real-world measurement comprises:
using the first machine learning model to estimate an outline of the roof;
using a second trained machine learning model to estimate a slope of the roof; and
calculating the area of the roof based on the outline of the roof and the slope of the roof.

11. The method of claim 1, wherein the estimate of the particular real-world measurement of the particular feature is different than the measurement of the second feature.

12. The method of claim 1, wherein the measurement of the second feature comprises output of a second machine learning model.

13. The method of claim 1, wherein using the machine learning model to estimate the particular real-world measurement of the particular feature is further based, at least in part, on a spatial relationship between the particular feature and the second feature.

14. The method of claim 6, wherein:
the dataset consists of the metadata describing the second one or more images of the second real-world structure; and
said using the machine learning model to estimate the second real-world measurement of the second feature of the second real-world structure is based exclusively on the dataset.

15. The method of claim 1, wherein the particular real-world measurement of the particular feature is one or more of an actual real-world length of the particular feature, an actual real-world area of the particular feature, an actual real-world volume of the particular feature, and an actual real-world slope of the particular feature.

16. The method of claim 15, wherein the length of the particular feature is a height or a perimeter length.

17. A system comprising:
one or more processors;
one or more non-transitory computer-readable media storing instructions which, when executed by the one or more processors, cause performance of:
training a machine learning model to estimate real-world measurements of features of real-world structures;
wherein training the machine learning model includes providing to the machine learning model:
a plurality of image sets, wherein each image set of the plurality of image sets includes one or more 2-dimensional images of an exterior of a corresponding real-world structure, and
a plurality of real-world measurements, wherein the plurality of real-world measurements includes, for each image set of the plurality of image sets, a real-world measurement of a feature of the exterior of the corresponding real-world structure; and
after training the machine learning model, using the machine learning model to estimate a particular real-world measurement of a particular feature of a particular real-world structure based on a particular digital image set containing one or more 2-dimensional images of an exterior of the particular real-world structure;

wherein the particular digital image set comprises metadata indicating a measurement of a second feature depicted in the one or more 2-dimensional images other than the particular feature, wherein the measurement of the second feature is a value based on an actual real-world distance of a dimension of the second feature;

wherein said using the machine learning model to estimate the particular real-world measurement of the particular feature comprises:

using the machine learning model to estimate the particular real-world measurement of the particular feature based, at least in part, on the measurement of the second feature, wherein the particular real-world measurement of the particular feature is a value based on an actual real-world distance of a dimension of the particular feature; and estimating a roof pitch, wherein the particular digital image set for estimating the roof pitch includes one or more lateral photos of the exterior of the particular real-world structure and no orthographic photos of the exterior of the particular real-world structure.

18. The system of claim 17 wherein estimating the particular real-world measurement is based on a polynomial regression.

19. The system of claim 17 wherein the instructions, when executed, further cause:

comparing the particular real-world structure with the plurality of real-world structures to identify how different the particular real-world structure is from the plurality of real-world structures;

based on how different the particular real-world structure is from the plurality of real-world structures, determining a confidence level associated with the particular real-world measurement.

20. The system of claim 17 wherein the particular digital image set includes an orthographic photo and one or more lateral photos.

21. The system of claim 17 wherein training the machine learning model is based on one or more metadata associated with at least one image in each image set of the plurality of image sets.

22. The system of claim 17 wherein the instructions, when executed, further cause:

after training the machine learning model, using the machine learning model to estimate a second real-world measurement of a second feature of a second real-world structure based on a dataset comprising metadata describing second one or more images of the second real-world structure;

wherein using the machine learning model to estimate the second real-world measurement involves generating an estimate of the second real-world measurement without providing the machine learning model the second one or more images themselves.

23. The system of claim 17 wherein training the machine learning model is based on output from a second machine learning model.

24. The system of claim 17 wherein the particular real-world structure is a particular building and the plurality of image sets correspond to a plurality of buildings.

25. The system of claim 24 wherein the particular feature of the particular building is a roof of the particular building, and the particular real-world measurement is an area of the roof.

26. The system of claim 25 wherein:

the machine learning model is a first machine learning model; and using the first machine learning model to estimate the particular real-world measurement comprises:

using the first machine learning model to estimate an outline of the roof;

using a second trained machine learning model to estimate a slope of the roof; and calculating the area of the roof based on the outline of the roof and the slope of the roof.

27. The system of claim 17, wherein the estimate of the particular real-world measurement of the particular feature is different than the measurement of the second feature.

28. The system of claim 17, wherein the measurement of the second feature comprises output of a second machine learning model.

29. The system of claim 17, wherein using the machine learning model to estimate the particular real-world measurement of the particular feature is further based, at least in part, on a spatial relationship between the particular feature and the second feature.

30. The system of claim 22, wherein:

the dataset consists of the metadata describing the second one or more images of the second real-world structure; and said using the machine learning model to estimate the second real-world measurement of the second feature of the second real-world structure is based exclusively on the dataset.

31. The system of claim 17, wherein the particular real-world measurement of the particular feature is one or more of an actual real-world length of the particular feature, an actual real-world area of the particular feature, an actual real-world volume of the particular feature, and an actual real-world slope of the particular feature.

32. The system of claim 31, wherein the length of the particular feature is a height or a perimeter length.

* * * * *